United States Patent
Arakawa

(10) Patent No.: US 6,455,868 B1
(45) Date of Patent: Sep. 24, 2002

(54) RADIATION IMAGE STORAGE PANEL READ-OUT METHOD AND APPARATUS FOR PERFORMING METHOD

(75) Inventor: Satoshi Arakawa, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/557,967

(22) Filed: Apr. 25, 2000

(30) Foreign Application Priority Data

Apr. 27, 1999 (JP) .......................................... 11-120243

(51) Int. Cl.$^7$ ............................................... G03B 42/02
(52) U.S. Cl. ...................................... 250/588; 250/584
(58) Field of Search ................................ 250/588, 584, 250/482, 487, 585, 586, 581, 591

(56) References Cited

U.S. PATENT DOCUMENTS 4,346,295 A    8/1982    Tanaka et al. ............... 250/337
5,877,508 A  * 3/1999    Arakawa et al. ............. 250/588

* cited by examiner

*Primary Examiner*—Hung Xuan Dang
(74) *Attorney, Agent, or Firm*—Sughrue Mion, PLLC

(57) ABSTRACT

A radiation image storage panel having rigidity, which is provided with a stimulable phosphor layer and on which a radiation image has been stored, is exposed to stimulating rays, which cause the radiation image storage panel to emit light in proportion to the amount of energy stored thereon during its exposure to radiation. The light emitted from a front surface of the radiation image storage panel and the light emitted from a back surface of the radiation image storage panel are photoelectrically converted into image signals respectively. The radiation image storage panel may comprise a transparent substrate having rigidity and the stimulable phosphor layer overlaid on the transparent substrate.

10 Claims, 2 Drawing Sheets

RADIATION IMAGE STORAGE PANEL READ-OUT METHOD AND APPARATUS FOR PERFORMING METHOD

BACKGROUND OF THE INVENTION

1. Field of the Invention

This invention relates to a radiation image read-out method, wherein light emitted from a front surface of a radiation image storage panel, which is provided with a stimulable phosphor layer, and light emitted from a back surface of the radiation image storage panel are detected respectively.

2. Description of the Prior Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet). The stimulable phosphor sheet, on which the radiation image has been stored, is then exposed to stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

As one of technique for photoelectrically detecting the light emitted by a stimulable phosphor sheet, a technique for detecting light emitted from front and back surfaces of a stimulable phosphor sheet and thereby detecting two image signals from the opposite surfaces of the stimulable phosphor sheet has heretofore been known. With the technique for detecting light emitted from front and back surfaces of a stimulable phosphor sheet and thereby detecting two image signals from the opposite surfaces of the stimulable phosphor sheet, for example, a radiation image storage panel is employed, which comprises a transparent substrate (such as transparent film having a thickness falling within the range of 100 $\mu$m to 500 $\mu$m) and a stimulable phosphor layer overlaid on the front surface side of the transparent substrate. Radiation is irradiated to the radiation image storage panel from its stimulable phosphor layer side, and radiation image information is stored on the stimulable phosphor layer of the radiation image storage panel. Thereafter, irradiation of stimulating rays is performed from the stimulable phosphor layer side of the radiation image storage panel. When the radiation image storage panel is exposed to the stimulating rays, light is emitted from each of the front surface side (i.e., the stimulable phosphor layer side) of the radiation image storage panel and the back surface side (i.e., the transparent substrate side) of the radiation image storage panel. The light emitted from the front surface side of the radiation image storage panel and the light emitted from the back surface side of the radiation image storage panel are respectively detected with photoelectric read-out means, which is located on the front surface side of the radiation image storage panel, and photoelectric read-out means, which is located on the back surface side of the radiation image storage panel. The technique for detecting light emitted from front and back surfaces of a stimulable phosphor sheet and thereby detecting two image signals from the opposite surfaces of the stimulable phosphor sheet is disclosed in, for example, U.S. Pat. No. 4,346,295. In cases where the technique for detecting light emitted from front and back surfaces of a stimulable phosphor sheet and thereby detecting two image signals from the opposite surfaces of the stimulable phosphor sheet is utilized, an addition process can be performed on the image signal components of the two image signals having been detected from the opposite surfaces of the stimulable phosphor sheet, which image signal components represent corresponding pixels on the front and back surfaces of the stimulable phosphor sheet. In this manner, the light collecting efficiency can be enhanced. Further, since noise components are uniformized, the signal-to-noise ratio of the obtained radiation image can be enhanced.

Ordinarily, the conventional radiation image storage panels are provided with thin film as the substrate and are flexible as a whole. Also, in cases where an image read-out operation is performed on the radiation image storage panel, for example, the stimulating rays are deflected in a main scanning direction, and the radiation image storage panel is conveyed in a sub-scanning direction. In this manner, the radiation image storage panel is scanned with the stimulating rays in two-dimensional directions. In cases where a technique for detecting light emitted from one surface alone of a radiation image storage panel (i.e., from only the front surface side of the radiation image storage panel) and thereby detecting only one image signal from the one surface of the radiation image storage panel is employed, no limitation is imposed upon how the back surface of the radiation image storage panel is to be supported. Therefore, in such cases, the back surface of the radiation image storage panel can be supported appropriately and conveyed at the read-out position that is scanned with the stimulating rays. Accordingly, even if the radiation image storage panel has flexibility as described above, the radiation image storage panel can be kept in a stable state at the read-out position by being supported appropriately from the back surface side of the radiation image storage panel at the read-out position. As a result, the image read-out operation can be performed accurately, while the radiation image storage panel is being kept in the state free from any deformation, sway, or the like.

However, it has been found that, in cases where the conventional radiation image storage panel having the flexibility as described above is employed in the technique for detecting light emitted from front and back surfaces of a radiation image storage panel and thereby detecting two image signals from the opposite surfaces of the radiation image storage panel, the problems described below occur. Specifically, in cases where the radiation image storage panel having the flexibility is employed, in order for the image read-out operation to be performed accurately, a conveyance mechanism cannot be kept simple.

More specifically, in cases where the technique for detecting light emitted from front and back surfaces of a radiation image storage panel and thereby detecting two image signals from the opposite surfaces of the radiation image storage panel is employed, it is necessary that a light guide member, or the like, for detecting the light emitted by the radiation image storage panel is located on the back surface side of the radiation image storage panel and at a position close to it at the read-out position. Therefore, the ordinary member for supporting the radiation image storage panel cannot be located on the back surface side of the radiation image storage panel at the read-out position. Accordingly, if the radiation image storage panel having the flexibility is employed in such cases, a complicated mechanism for preventing the radiation image storage panel from being deformed due to deflection by gravity must be utilized at the read-out position.

SUMMARY OF THE INVENTION

The primary object of the present invention is to provide a radiation image read-out method, wherein an operation for detecting light emitted from front and back surfaces of a radiation image storage panel and thereby detecting two image signals from the opposite surfaces of the radiation image storage panel is capable of being performed accurately.

Another object of the present invention is to provide a radiation image read-out method, wherein an operation for detecting light emitted from front and back surfaces of a radiation image storage panel and thereby detecting two image signals from the opposite surfaces of the radiation image storage panel is capable of being performed accurately and efficiently.

The present invention provides a radiation image read-out method, wherein a radiation image storage panel, which is provided with a stimulable phosphor layer and on which a radiation image has been stored, is exposed to stimulating rays, which cause the radiation image storage panel to emit light in proportion to the amount of energy stored thereon during its exposure to radiation, and the light emitted from a front surface of the radiation image storage panel and the light emitted from a back surface of the radiation image storage panel are photoelectrically converted into image signals respectively, the method comprising employing a radiation image storage panel, which has rigidity, as the radiation image storage panel.

In the radiation image read-out method in accordance with the present invention, the radiation image storage panel may comprise a transparent substrate having rigidity and the stimulable phosphor layer overlaid on the transparent substrate.

Also, the radiation image read-out method in accordance with the present invention should preferably be modified such that, in cases where the radiation image storage panel comprises a transparent substrate, which constitutes the back surface of the radiation image storage panel, and the stimulable phosphor layer, which is overlaid on the front surface side of the transparent substrate, and the light emitted from the back surface of the radiation image storage panel is guided through a light guide member, which has a light input face located close to the back surface of the radiation image storage panel, into photoelectric conversion means, the light guide member is located so as to satisfy the formulas:

$$t \leq 1/(2 \tan \theta) - s$$

$$\sin \theta = n2/n1$$

in which t represents the thickness of the transparent substrate, s represents the distance between the back surface of the radiation image storage panel and the light input face of the light guide member, 1 represents the width of the light input face of the light guide member, n2 represents the refractive index of air, and n1 represents the refractive index of the transparent substrate.

Further, in the radiation image read-out method in accordance with the present invention, an image read-out operation for detecting the light emitted by the radiation image storage panel is a panel-securing image read-out operation, in which the radiation image storage panel is kept stationary, and read-out means is moved with respect to the radiation image storage panel.

The term "radiation image storage panel having rigidity" as used herein means the radiation image storage panel having a level of rigidity such that the amount of deflection of a portion of the radiation image storage panel by gravity, which portion extends over the distance (ordinarily, the distance falling within the range of approximately 50 mm to approximately 200 mm) between radiation image storage panel support members (in the cases of the embodiment described later, endless belts 19a and 19b) located on both sides of the position that is scanned with the stimulating rays, does not adversely affect the light guiding efficiency. By way of example, the level of rigidity, which does not adversely affect the light guiding efficiency, is such that, in cases where the radiation image storage panel is supported in a cantilever beam-like form, in which a portion of the radiation image storage panel is projected by a length of 50 mm from a support point and the end of the projected portion of the radiation image storage panel is not supported, the amount of downward deflection of the end (the free end) of the projected portion of the radiation image storage panel is at most 2 mm, and is preferably at most 1 mm. (For example, in cases where the radiation image storage panel is supported and conveyed by an endless belt, the support point represents the foremost support position of the endless belt with respect to the direction of conveyance. In cases where the radiation image storage panel is nipped between a pair of upper and lower rollers and is supported and conveyed in this state, the support point represents the position that is nipped and supported by the rollers.) In order for such a level of rigidity to be imparted to the radiation image storage panel, for example, the transparent substrate having the level of rigidity may be employed. In such cases, a glass sheet, a plastic sheet (e.g., a polycarbonate sheet or an acrylic sheet), or the like, which is transparent with respect to the light emitted by the radiation image storage panel and which has a thickness falling within the range of approximately 0.5 mm to approximately 5 mm, may be employed as the transparent substrate.

With the radiation image read-out method in accordance with the present invention, instead of a conventional radiation image storage panel with flexibility being employed, the radiation image storage panel having rigidity is employed as the radiation image storage panel. Therefore, in cases where the operation for detecting light emitted from the front and back surfaces of the radiation image storage panel and thereby detecting two image signals from the opposite surfaces of the radiation image storage panel is to be performed, in which the radiation image storage panel cannot be sufficiently supported from the back surface at the time of the image read-out operation, there is no risk that the radiation image storage panel will be deflected at the read-out position and will be swayed at the read-out position during the conveyance of the radiation image storage panel. Accordingly, a failure in image readout due to deflection and swaying can be prevented from occurring, and the image read-out operation can be performed accurately.

With the radiation image read-out method in accordance with the present invention, wherein the radiation image storage panel comprises the transparent substrate having rigidity and the stimulable phosphor layer overlaid on the transparent substrate, rigidity can be easily and sufficiently imparted to the radiation image storage panel.

In cases where the substrate of the radiation image storage panel is constituted of the transparent substrate having rigidity, such as a glass sheet, in order for light guiding to be performed efficiently, the critical angle at the transparent substrate should be taken into consideration, and the light guide member on the back surface side of the radiation image storage panel should be located appropriately.

Therefore, as described above, in the radiation image read-out method in accordance with the present invention, the critical angle at the transparent substrate should preferably be taken into consideration, and the light guide member should preferably be located so as to satisfy the formulas shown above, in which t represents the thickness of the transparent substrate, s represents the distance between the back surface of the radiation image storage panel and the light input face of the light guide member, 1 represents the width of the light input face of the light guide member, n2 represents the refractive index of air, and n1 represents the refractive index of the transparent substrate. With the radiation image read-out method in accordance with the present invention, in which the light guide member is located in this manner, the light emitted by the stimulable phosphor layer, which light passes through the transparent substrate and emanates from the back surface of the radiation image storage panel, can be guided efficiently with little loss. In this manner, the image read-out operation can be performed, in which the light guiding efficiency is enhanced with little loss by the consideration of the critical angle at the transparent substrate.

DESCRIPTION OF THE PREFERRED EMBODIMENTS

The present invention will hereinbelow be described in further detail with reference to the accompanying drawings.

Firstly, a radiation image storage panel employed in an embodiment of the radiation image read-out method in accordance with the present invention will be described hereinbelow with reference to FIG. 1.

Figure 1:
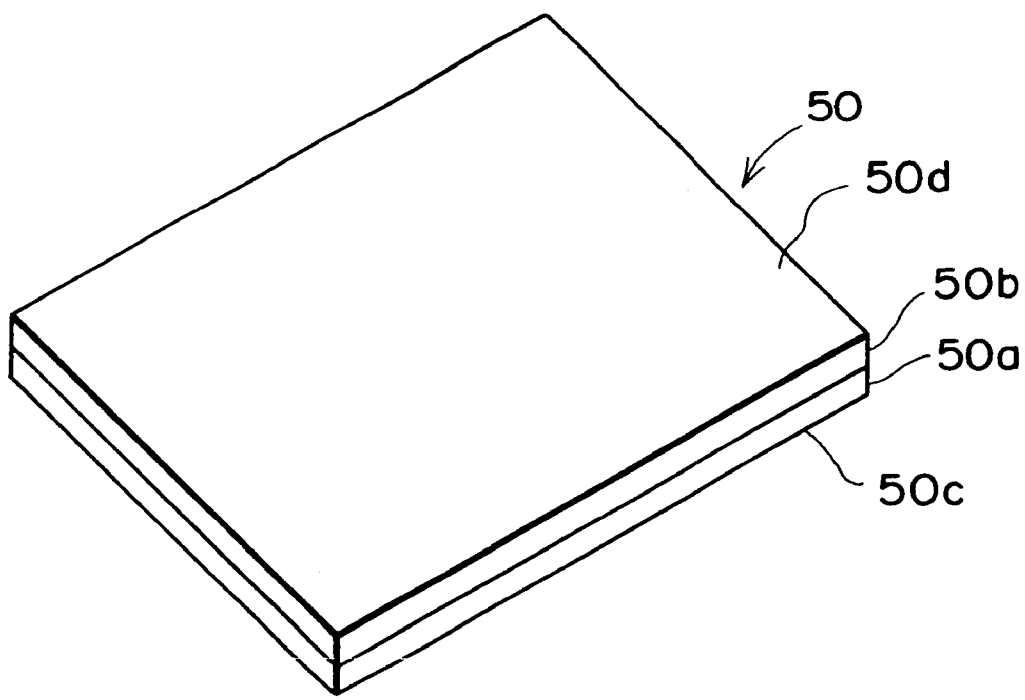
FIG. 1 is a perspective view showing an example of a radiation image storage panel employed in an embodiment of the radiation image read-out method in accordance with the present invention.

FIG. 1 is a perspective view showing an example of a radiation image storage panel employed in an embodiment of the radiation image read-out method in accordance with the present invention. With reference to FIG. 1, a radiation image storage panel 50 comprises a sheet-shaped, colorless, transparent substrate 50a, which transmits light emitted by a stimulable phosphor layer, and a stimulable phosphor layer (e.g., a BaF(Br, I):Eu$^{2+}$layer) 50b overlaid on a front surface side of the transparent substrate 50a. The surface of the radiation image storage panel 50 on the side of the transparent substrate 50a is taken as a back surface 50c of the radiation image storage panel 50. The surface of the radiation image storage panel 50 on the side of the stimulable phosphor layer 50b is taken as a front surface 50d of the radiation image storage panel 50. The transparent substrate 50a is formed from glass and has rigidity. The radiation image storage panel 50 comprises the substrate, which is formed from glass, as the transparent substrate 50a and therefore has sufficient rigidity as a whole. Though not shown, a transparent protective layer having a thickness falling within the range of 2 $\mu$m to 50 $\mu$m is overlaid on the front surface side of the stimulable phosphor layer 50b.

How an operation for detecting light emitted from the front and back surfaces of the radiation image storage panel 50 and thereby detecting two image signals from the opposite surfaces of the radiation image storage panel 50 is performed will be described hereinbelow with reference to FIG. 2.

Figure 2:
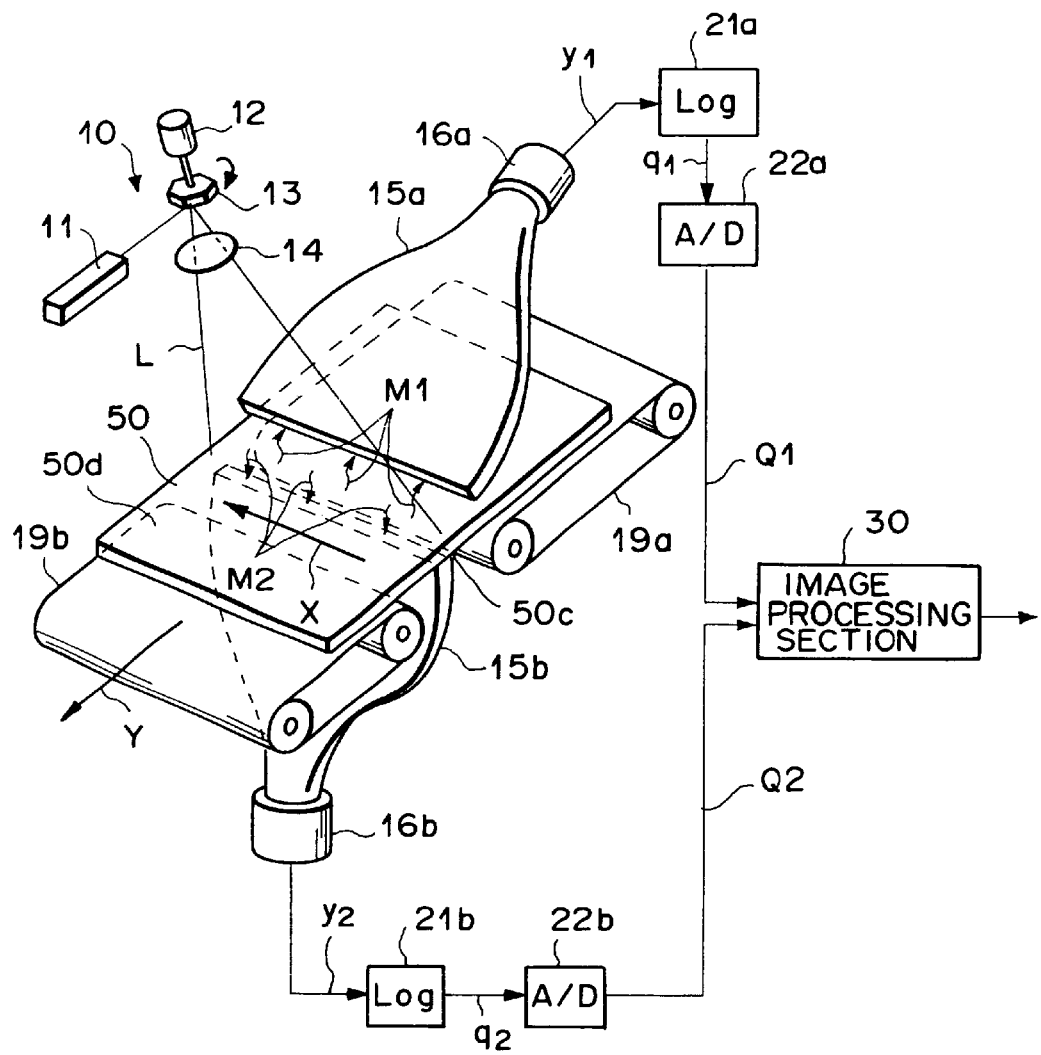
FIG. 2 is a schematic view showing an example of a radiation image read-out apparatus for carrying out the embodiment of the radiation image read-out method in accordance with the present invention.

FIG. 2 shows an example of a radiation image read-out apparatus for performing an image read-out operation, in which a radiation image having been stored on the radiation image storage panel 50 is read out from the radiation image storage panel 50. The radiation image read-out apparatus shown in FIG. 2 is constituted such that the radiation image, which has been stored on the stimulable phosphor layer 50b of the radiation image storage panel 50 shown in FIG. 1, is read out from both the front surface 50d and the back surface 50c of the radiation image storage panel 50.

In the radiation image read-out apparatus shown in FIG. 2, the radiation image storage panel 50, on which the radiation image information has been stored, is set at a predetermined position on an endless belt 19a such that the front surface 50d of the radiation image storage panel 50 stands facing up. The radiation image storage panel 50 is conveyed in the direction (sub-scanning direction), which is indicated by the arrow Y, by endless belts 19a and 19b, which are driven by motors (not shown).

A laser beam L, which serves as stimulating rays, is produced by a laser beam source 11. The laser beam L is reflected and deflected by a rotating polygon mirror 13, which is being quickly rotated by a motor 12 in the direction indicated by the arrow. The laser beam L is then converged by a scanning lens 14 onto the front surface 50d of the radiation image storage panel 50 and is caused to scan the front surface 50d at uniform speed. The front surface 50d of the radiation image storage panel 50 is thus scanned with the laser beam L in the main scanning direction indicated by the arrow X. By the main scanning with the laser beam L and the sub-scanning of the radiation image storage panel 50, the entire area of the radiation image storage panel 50 is exposed to the laser beam L.

The laser beam L impinging upon the radiation image storage panel 50 causes the stimulable phosphor layer 50b of the radiation image storage panel 50 to emit light in proportion to the amount of energy stored thereon during its exposure to radiation. Light M1 in accordance with the stored radiation image information is emitted from the front surface 50d of the radiation image storage panel 50. Also, Light M2 in accordance with the stored radiation image information is emitted from the back surface 50c of the radiation image storage panel 50.

The light M1, which has been emitted from the front surface 50d of the radiation image storage panel 50, is guided by a light guide member 15a, which is located close to the front surface 50d, into a photomultiplier 16a and is photoelectrically detected by the photomultiplier 16a. Also, the light M2, which has been emitted from the back surface 50c of the radiation image storage panel 50, is guided by a light guide member 15b, which is located close to the back surface 50c, into a photomultiplier 16b and is photoelectrically detected by the photomultiplier 16b. Each of the light guide member 15a and the light guide member 15b is made from a light guiding material, such as an acrylic plate. Each of the light guide member 15a and the light guide member 15b has a linear light input face, which is positioned to extend along the main scanning line on the radiation image storage panel 50, and a ring-shaped light output face, which is positioned so that it is in close contact with a light receiving face of the corresponding photomultiplier 16a or 16b. The emitted light M1, which has entered the light guide member 15a from its light input face, is guided through repeated total reflection inside of the light guide member 15a, emanates from the light output face, and is received by the photomultiplier 16a. In this manner, the amount of the emitted light M1, which amount represents the stored radiation image information, is converted into an analog image signal y1 by the photomultiplier 16a. In the same manner as that described above, the emitted light M2, which has entered the light guide member 15b from its light input face, is guided through repeated total reflection inside of the light guide member 15b, emanates from the light output face, and is received by the photomultiplier 16b. In this manner, the amount of the emitted light M2, which amount represents the stored radiation image information, is converted into an analog image signal y2 by the photomultiplier 16b.

The analog image signal y1 generated by the photomultiplier 16a is logarithmically amplified by a logarithmic amplifier 21a and is converted into a logarithmic image signal q1. The logarithmic image signal q1 having been obtained from the logarithmic amplification is fed into an analog-to-digital conversion circuit 22a. The analog-to-digital converter 22a samples the logarithmic image signal q1 with a predetermined sampling period T, and the sampled signal is converted into a digital image signal Q1. In the same manner as that described above, the analog image signal y2 generated by the photomultiplier 16b is logarithmically amplified by a logarithmic amplifier 21b and is converted into a logarithmic image signal q2. The logarithmic image signal q2 having been obtained from the logarithmic amplification is fed into an analog-to-digital conversion circuit 22b. The analog-to-digital converter 22b samples the logarithmic image signal q2 with a predetermined sampling period T, and the sampled signal is converted into a digital image signal Q2. The digital image signal Q1 and the digital image signal Q2 are fed into an image processing section 30.

In the image processing section 30, the image signal components of the digital image signal Q1 and the digital image signal Q2, which image signal components represent corresponding pixels on the front surface side and the back surface side of the radiation image storage panel 50, are weighted and added to each other in a predetermined addition ratio. An image signal Q, which has been obtained from the weighted addition, is then subjected to various kinds of signal processing, such as gradation processing and processing in the frequency domain. A processed image signal having thus been obtained is fed into an external image reproducing apparatus, or the like. The addition ratio of the digital image signal Q1, which has been detected from the front surface side of the radiation image storage panel 50, to the digital image signal Q2, which has been detected from the back surface side of the radiation image storage panel 50, is set appropriately such that noise may be suppressed.

As described above, in cases where the operation for detecting the light emitted from the front surface 50d and the back surface 50c of the radiation image storage panel 50 and thereby detecting the two image signals from the opposite surfaces of the radiation image storage panel 50 is to be performed, it is necessary that the light guide member 15b is also located on the back surface side of the radiation image storage panel 50 and at a position close to the back surface 50c at the read-out position. Therefore, at the read-out position, the radiation image storage panel 50 cannot be sufficiently supported from the back surface side. However, in this embodiment, the radiation image storage panel 50 is provided with the transparent substrate 50a having rigidity and is thereby imparted with rigidity as a whole. Therefore, even if the radiation image storage panel 50 is not sufficiently supported from the back surface side at the read-out position, there will be no risk that the radiation image storage panel 50 will be deflected by gravity at the read-out position. Also, there will be no risk that the radiation image storage panel 50 will sway (or vibrate) at the read-out position during the conveyance. Accordingly, the image read-out operation can be performed accurately with the technique for detecting light emitted from front and back surfaces of the radiation image storage panel and thereby detecting two image signals from the opposite surfaces of the radiation image storage panel.

The thickness of the transparent substrate 50a formed from glass should preferably beat least 1 mm. In cases where the thickness of the transparent substrate 50a formed from glass is at least 1 mm, even if the radiation image storage panel 50 cannot be supported from the back surface side at the read-out position in the operation for detecting light emitted from front and back surfaces of the radiation image storage panel and thereby detecting two image signals from the opposite surfaces of the radiation image storage panel, the radiation image storage panel 50 can be imparted with a level of rigidity necessary for substantially avoiding deflection and sway of the radiation image storage panel 50.

Preferable relationship between the radiation image storage panel 50 and the light guide member 15b, which is located on the bask surface side of the radiation image storage panel 50, in the radiation image read-out apparatus described above will be described hereinbelow. In the operation for detecting light emitted from front and back surfaces of the radiation image storage panel and thereby detecting two image signals from the opposite surfaces of the radiation image storage panel, as for the bask surface side of the radiation image storage panel 50, the light M2, which has passed through the transparent substrate 50a and has emanated from the back surface 50c, is detected. Therefore, the effects of the critical angle at the transparent substrate 50a occur. If the critical angle is not taken into consideration when the location of the light guide member 15b is determined, the emitted light M2 cannot be guided sufficiently.

Figure 3:
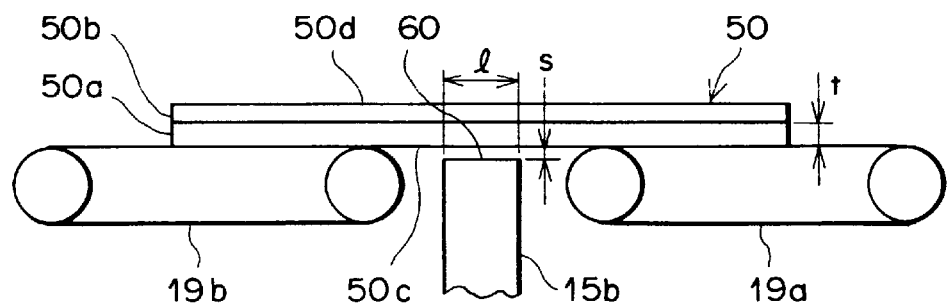
FIG. 3 is an explanatory view showing relationship between the radiation image storage panel and a light guide member located on the back surface side of the radiation image storage panel in the radiation image read-out

In the radiation image read-out apparatus described above, the location of the light guide member 15b is determined by taking the foregoing into consideration. Specifically, as illustrated in FIG. 3, in cases where a light input face 60 of the light guide member 15b is located in parallel with the back surface 50c of the radiation image storage panel 50, the light guide member 15b is located so as to satisfy the formulas:

$$t \leq 1/(2 \tan \theta) - s$$

$$\sin \theta = n2/n1$$

in which t represents the thickness of the transparent substrate 50a, s represents the distance between the back surface 50c of the radiation image storage panel 50 and the light input face 60 of the light guide member 15b, l represents the width of the light input face 60 of the light guide member 15b (i.e., the width taken along the sub-scanning direction), n2 represents the refractive index of air, and n1 represents the refractive index of the transparent substrate 50a.

In cases where the light guide member 15b is located so as to satisfy the formulas shown above, the light M2 emanating from the transparent substrate 50a can be guided by the light guide member 15b efficiently with little loss, and a sufficient amount of the emitted light M2 can be detected with little loss. Specifically, in accordance with the relationship of the critical angle at the transparent substrate 50a, a major part of the emitted light M2, which has passed through the transparent substrate 50a and emanates from the transparent substrate 50a, is radiated within a certain range. Therefore, in cases where the light guide member 15b is located so as to satisfy the formulas shown above, the major part of the emitted light M2 can be received by the light input face 60 of the light guide member 15b, and the light guiding can be performed efficiently.

Specifically, by way of example, the thickness t of the transparent substrate 50a formed from glass may be set at 2 mm, and the width 1 of the light guide member 15b may be set at 6 mm. Also, the distance s between the back surface 50c of the radiation image storage panel 50 and the light input face 60 of the light guide member 15b may be set at 0.5 mm.

In the embodiment described above, in order for the scanning with the stimulating rays in two-dimensional directions to be performed, the radiation image storage panel 50 is moved in the sub-scanning direction. Alternatively, in cases where the radiation image storage panel 50 has rigidity, in order for the scanning of the radiation image storage panel 50 in two-dimensional directions to be performed, a panel-securing image read-out operation may be employed. Specifically, in the panel-securing image read-out operation, the radiation image storage panel 50 is kept stationary, and read-out means, which comprises the rotating polygon mirror 13, the scanning lens 14, the light guide member 15a, the light guide member 15b, the photomultiplier 16a, and the photomultiplier 16b, is moved in the sub-scanning direction. In this manner, the emitted light M1 and the emitted light M2 emitted from the opposite surfaces of the radiation image storage panel 50 may be detected.

What is claimed is:

1. A radiation image read-out method, comprising:

exposing a radiation image storage panel, which is provided with a stimulable phosphor layer and on which a radiation image has been stored, to stimulating rays, thereby causing the radiation image storage panel to emit light in proportion to the amount of energy stored thereon during its exposure to radiation, and photoelectrically converting the light emitted from a front surface of the radiation image storage panel and the light emitted from a back surface of the radiation image storage panel into image signals respectively, wherein the radiation image storage panel has rigidity, and wherein the radiation image storage panel comprises a transparent substrate constituting the back surface of the radiation image storage panel, and the stimulable phosphor layer is overlaid on the front surface side of the transparent substrate, the method further comprising:

locating a light input face of a light member close to the back surface of the radiation image storage panel;

guiding the light emitted from the back surface of the radiation image storage panel through the light guide member into photoelectric conversion means, wherein the light guide member is located so as to satisfy the formulas:

$t \leq 1/(2 \tan \theta) - s$ $\sin\theta = n2/n1$ in which t represents the thickness of the transparent substrate, s represents the distance between the back surface of the radiation image storage panel and the light input face of the light guide member, 1 represents the width of the light input face of the light guide member, n2 represents the refractive index of air, and n1 represents the refractive index of the transparent index of the transparent substrate.

2. A method as defined in claim 1 wherein the radiation image storage panel comprises a transparent substrate having rigidity and the stimulable phosphor layer overlaid on the transparent substrate.

3. A method as defined in claim 2 wherein an image read-out operation for detecting the light emitted by the radiation image storage panel is a panel-securing image read-out operation, the method further comprising:

keeping the radiation image storage panel stationary, and moving read-out means with respect to the radiation image storage panel.

4. A method as defined in claim 1 wherein an image read-out operation for detecting the light emitted by the radiation image storage panel is a panel-securing image read-out operation, the method further comprising:

keeping the radiation image storage panel stationary, and moving read-out means with respect to the radiation image storage panel.

5. A radiation image read-out apparatus, for processing a radiation image storage panel that is rigid, has a back surface comprising a transparent substrate, and has a stimulable phosphor layer overlaid on a front side surface of the transparent substrate, the apparatus comprising:

a laser source that produces a laser beam, the laser beam impinging upon a front surface of the radiation image storage panel, stimulating the radiation image storage panel to emit light;

a first photomultiplier, photoelectrically detecting light emitted from the front surface of the radiation image storage panel;

a first light guide member, having a light input face located close to the front surface of the radiation image storage panel and guiding light emitted from the front surface of the radiation image storage panel to said first photomultiplier;

a second photomultiplier, photoelectrically detecting light emitted from the back surface of the radiation image storage panel;

a second light guide member, having a light input face located close to the back surface of the radiation image storage panel and guiding light emitted from the back surface of the radiation image storage panel to said second photomultiplier; and an image processor, weighting and adding signals corresponding to the light detected by the first and second photomultipliers, processing an image signal obtained from the weighted addition, and outputting a processed image signal;

wherein the light input face of said second light guide member is located so as to satisfy the formulas:

$t \leq 1/(2 \tan \theta) - s$ $\sin\theta = n2/n1$ in which t represents the thickness of the transparent substrate, s represents the distance between the back surface of the radiation image storage panel and the light input face of the second light guide member, 1 represents the width of the light input face of the second light guide member, n2 represents the refractive index of air, and n1 represents the refractive index of the transparent index of the transparent substrate.

6. A radiation image read-out apparatus as defined in claim 5, wherein:

the laser beam is scanned across the radiation image storage panel in a scanning direction;

l represents the width of the light input face of the second light guide member in a sub-scanning direction; and the sub-scanning direction is perpendicular to the scanning direction of the laser beam and parallel to the back surface of the radiation image storage panel.

7. A radiation image read-out apparatus as defined in claim 6, further comprising at least one endless belt that transports the radiation image storage panel in the sub-scanning direction.

8. A radiation image read-out apparatus as defined in claim 6, wherein the radiation image storage panel is kept stationary and at least the first and second light guide members are moved in the sub-scanning direction.

9. A radiation image read-out apparatus as defined in claim 6, wherein light input faces of the first and second light guide members have a shape extending along the scanning direction of the laser beam.

10. A radiation image read-out apparatus, for processing a radiation image storage panel that is rigid, has a back surface comprising a transparent substrate, and has a stimulable phosphor layer overlaid on a front side surface of the transparent substrate, the apparatus comprising:

a laser source that produces a laser beam, the laser beam impinging upon a front surface of the radiation image storage panel, stimulating the radiation image storage panel to emit light;

a photomultiplier, photoelectrically detecting light emitted from the back surface of the radiation image storage panel;

a light guide member, having a light input face located close to the back surface of the radiation image storage panel and guiding light emitted from the back surface of the radiation image storage panel to said photomultiplier; and an image processor, processing a signal corresponding to the light detected by the photomultiplier, and outputting a processed image signal;

wherein the light input face of said light guide member is located so as to satisfy the formulas:

$$t \leq 1/(2 \tan \theta) - s$$

$$\sin\theta = n2/n1$$

in which t represents the thickness of the transparent substrate, s represents the distance between the back surface of the radiation image storage panel and the light input face of the light guide member, l represents the width of the light input face of the light guide member, n2 represents the refractive index of air, and n1 represents the refractive index of the transparent index of the transparent substrate.

* * * * *